US009929897B2

(12) United States Patent
Thomas et al.

(10) Patent No.: US 9,929,897 B2
(45) Date of Patent: Mar. 27, 2018

(54) PERFORMING A PROTOCOL, SUCH AS MICRO BIDIRECTIONAL FORWARDING DETECTION, ON MEMBER LINKS OF AN AGGREGATED LINK THAT USES AN ADDRESS OF THE AGGREGATED LINK

(71) Applicant: Juniper Networks, Inc., Sunnyvale, CA (US)

(72) Inventors: Reji Thomas, Bangalore (IN); Punit Kumar Jaiswal, Bangalore (IN); Pranavadatta Dn, Bangalore (IN); Jithin Girish, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 163 days.

(21) Appl. No.: 15/091,393

(22) Filed: Apr. 5, 2016

(65) Prior Publication Data
US 2017/0288946 A1    Oct. 5, 2017

(51) Int. Cl.
| H04L 25/48 | (2006.01) |
| H04L 12/24 | (2006.01) |
| H04L 12/741 | (2013.01) |
| H04L 29/08 | (2006.01) |
| H04L 12/707 | (2013.01) |
| H04L 12/703 | (2013.01) |
| H04L 12/26 | (2006.01) |

(52) U.S. Cl.
CPC ...... *H04L 41/0654* (2013.01); *H04L 43/0811* (2013.01); *H04L 45/22* (2013.01); *H04L 45/28* (2013.01); *H04L 45/74* (2013.01); *H04L 69/324* (2013.01); *H04L 41/0213* (2013.01)

(58) Field of Classification Search
CPC ...................................................... H04L 45/28
USPC ............................................................ 370/245
See application file for complete search history.

(56) References Cited

U.S. PATENT DOCUMENTS

| 7,561,527 | B1 | 7/2009 | Katz et al. | |
| 8,774,179 | B1 | 7/2014 | Gaggara | |
| 9,722,896 | B2* | 8/2017 | Sontakke | H04L 43/0811 |
| 2008/0253295 | A1* | 10/2008 | Yumoto | H04L 43/0811 370/245 |
| 2009/0323520 | A1* | 12/2009 | Kapoor | H04L 41/0681 370/225 |

(Continued)

OTHER PUBLICATIONS

European Search Report to corresponding European Patent Application No. 16175131.8, dated Jan. 18, 2017 (6 pgs.).

(Continued)

*Primary Examiner* — Edan Orgad
*Assistant Examiner* — Emmanuel Maglo
(74) *Attorney, Agent, or Firm* — John C. Pokotylo; Pokotylo Patent Services

(57) ABSTRACT

The problem of being unable to run microBFD using an IPv6 address over any member links of a layer 2 LAG when the LAG is DOWN (and its IPv6 address becomes or is TENTATIVE), is solved by running DAD for the address configured for the microBFD once the individual link is in DISTRIBUTING or STANDBY state and triggering (or starting) microBFD once the DAD for that address completes successfully. Further, member links of the LAG may be permitted to continue running microBFD even if the LAG interface is DOWN and even if some other member links (but not all member links) of the LAG are DOWN.

21 Claims, 8 Drawing Sheets

(56) References Cited

U.S. PATENT DOCUMENTS

| | | | | | |
|---|---|---|---|---|---|
| 2010/0049868 | A1* | 2/2010 | Ginsberg | ................ | H04L 45/00 709/242 |
| 2012/0281541 | A1* | 11/2012 | Palmer | .................. | H04L 45/245 370/241 |
| 2013/0114402 | A1* | 5/2013 | Ould-Brahim | ...... | H04L 43/0811 370/225 |
| 2013/0191463 | A1 | 7/2013 | Thubert | | |
| 2014/0149604 | A1* | 5/2014 | Baig | .................. | H04L 61/6059 709/245 |
| 2015/0350043 | A1* | 12/2015 | Kovacs | ................... | H04L 12/28 370/245 |
| 2015/0381466 | A1* | 12/2015 | Sontakke | ............ | H04L 43/0811 370/241.1 |

OTHER PUBLICATIONS

Request for Comments 5881, "Bidirectional Forwarding Detection (BFD) for IPv4 and IPv6 (Sinlge Hop)" (Internet Engineering Task Force, Jun. 2010).

Request for Comments 7130, "Bidirectional Forwarding Detection (BFD) on Link Aggregation Group (LAG) Interfaces" (Internet Engineering Task Force, Feb. 2014).

Request for Comments 7527, "Enhanced Duplicate Address Detection" (Internet Engineering Task Force, Apr. 2015).

*Understanding Independent Micro BFD Sessions for LAG*, available online at http://www.juniper.net/documentation/en_US/junos13.3/topics/concept/bfd-for-lag-overview.html and downloaded on Apr. 7, 2016.

* cited by examiner

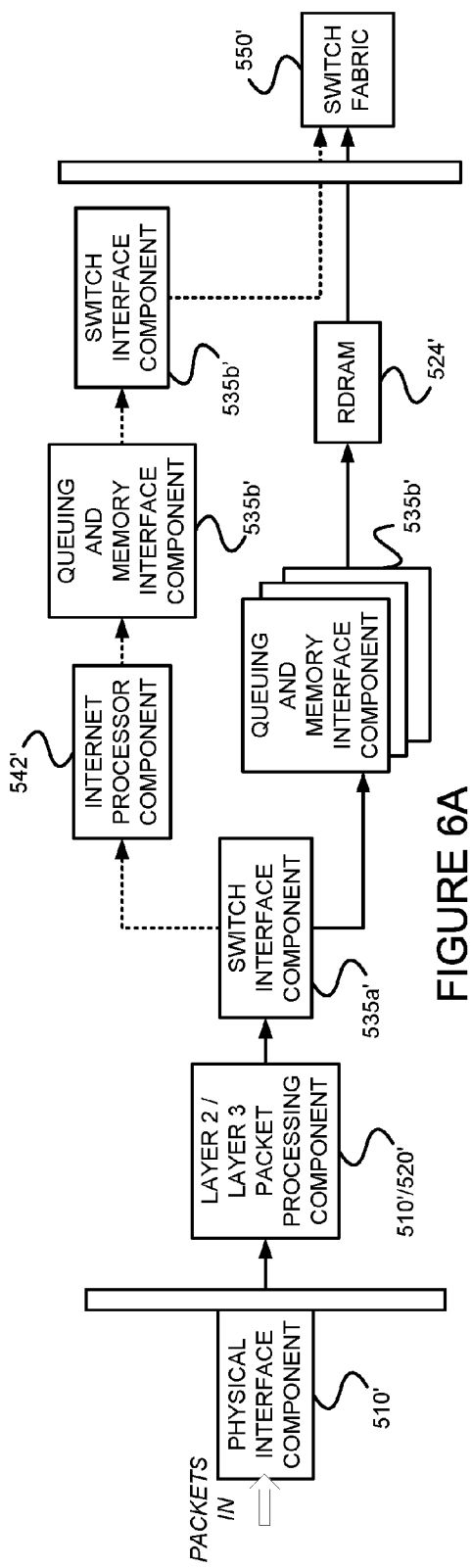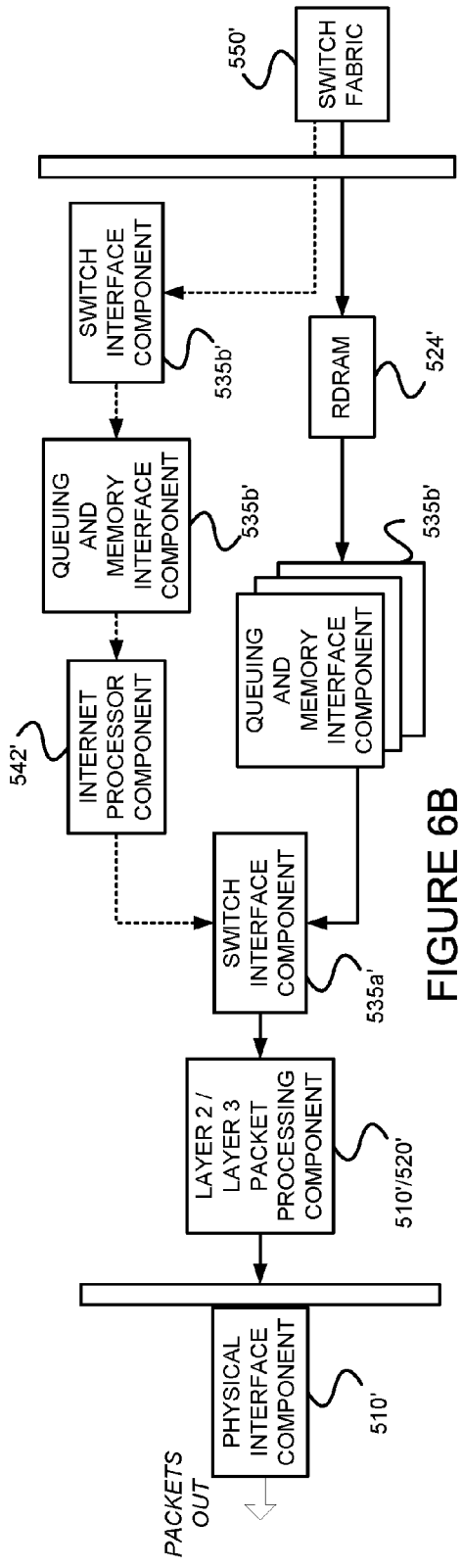
FIGURE 6A
FIGURE 6B

PERFORMING A PROTOCOL, SUCH AS MICRO BIDIRECTIONAL FORWARDING DETECTION, ON MEMBER LINKS OF AN AGGREGATED LINK THAT USES AN ADDRESS OF THE AGGREGATED LINK

§1 BACKGROUND

§1.1. Field of the Invention

The present invention concerns checking forwarding over a network link. More specifically, the present invention concerns checking forwarding over an aggregated group of links using a protocol, such as micro Bidirectional Forwarding Detection ("microBFD") for example.

§1.2 Background Information

In the following description, a "request for comments" ("RFC") is a type of publication from the Internet Engineering Task Force ("IETF") and the Internet Society, the principal technical development and standards-setting bodies for the Internet. The present invention is not limited by any requirements of any (e.g., cited) RFC.

Example embodiments consistent with the claimed invention can be embodied on routers or switches (more generally referred to as "data forwarding devices" or "data forwarding systems"), for example, which are typically used in communications networks. FIG. 1 illustrates two data forwarding systems 110 and 120 coupled via communications links 130. The links may be physical links or "wireless" links. The data forwarding systems 110,120 may be routers for example. If the data forwarding systems 110,120 are example routers, each may include a control component (e.g., a routing engine) 114,124 and a forwarding component 112,122. Each data forwarding system 110,120 includes one or more interfaces 116,126 that terminate the one or more communications links 130.

§1.2.1 Checking Forwarding Over Network Links

In communications networks, it is often necessary or desirable to check that a network link is available to properly forward data. Unless specified otherwise, a "network link" or "link" may be interpreted to include interfaces terminating a physical or wireless link, and in some instances, may be interpreted to include forwarding engines of the data forwarding systems. One way to check data forwarding is by using so-called "Bidirectional Forwarding Detection" ("BFD"), which is described in RFC 5880 and U.S. Pat. No. 7,561,527 (both incorporated herein by reference). More specifically, the BFD protocol defined in RFC5880 provides a mechanism to detect faults in the bidirectional path between two forwarding engines, including interfaces, data links, and to the extent possible the forwarding engines themselves, with potentially very low latency. The BFD protocol also provides a fast mechanism for detecting communication failures on any data links and the protocol can run over any media and at any protocol layer.

§1.2.1.1 Checking Forwarding Over Aggregated Network Links

A "Link Aggregation Group ("LAG"), as defined in IEEE802.1AX-2008 (incorporated herein by reference), provides mechanisms to combine multiple physical links into a single logical link. This logical link provides higher bandwidth and better resiliency, because if one of the physical member links fails, the aggregate logical link can continue to forward traffic over the remaining operational physical member links. The data forwarding demands placed on the links of a LAG can be distributed over the links of the LAG using load balancing. (See, e.g., the articles: Configuring Load Balancing on a LAG Link, available online at http://www.juniper.net/documentation/en_US/junos14.1/topics/task/configuration/layer-2-services-load-balancing-and-link-aggregation-configuring.html, and incorporated herein by reference; and Understanding Aggregated Ethernet Load Balancing, available online at http://www.juniper.net/documentation/en_US/junos13.3/topics/concept/load-balance-technique-overview.html and incorporated herein by reference.) FIG. 2 illustrates two data forwarding systems 110' and 120' coupled via communications links 130', at least some of which are aggregated to define a LAG 240. In the example system of FIG. 2, the LAG 240 has layer 2 interfaces 242,244.

As was the case with the system of FIG. 1, in the system of FIG. 2, the links 130' may be physical links or "wireless" links. The data forwarding systems 110',120' may be routers for example. If the data forwarding systems 110',120' are example routers, each may include a control component (e.g., a routing engine) 114',124' and a forwarding component 112',122'. Each data forwarding system 110',120' includes one or more interfaces 116',126' that terminate the one or more communications links 130'.

In one example, the "Link Aggregation Control Protocol" ("LACP") is used to detect failures on a per-physical-member link basis. However, the use of BFD for failure detection would (1) provide a faster detection, (2) provide detection in the absence of LACP, and (3) be able to verify the ability for each member link to forward layer 3 ("L3") packets. Unfortunately, however, running a single BFD session over the aggregation without internal knowledge of the member links would make it impossible for BFD to guarantee detection of failures of the physical member links. RFC 7130, titled "Bidirectional Forwarding Detection (BFD) on Link Aggregation Group (LAG) Interfaces" (incorporated herein by reference), enables link continuity to be verified for every member link. More specifically, RFC 7130 describes running an "Asynchronous" mode BFD session over each LAG member link and making BFD control whether the LAG member link should be part of the layer 2 ("L2") load-balancing table of the LAG interface in the presence or the absence of LACP. Although there are native Ethernet mechanisms to detect failures (See, e.g., IEEE802.1ax, and IEEE802.3ah, incorporated herein by reference.) that could be used for LAG, the solution defined in RFC 7130 enables operators who have already deployed BFD over different technologies (e.g., IP, MPLS) to use a common failure detection mechanism. The article Understanding Independent Micro BFD Sessions for LAG, available online at http://www.juniper.net/documentation/en_US/junos13.3/topics/concept/bfd-for-lag-overview.html and incorporated herein by reference, discusses one way to implement microBFD.

§1.2.1.2 Potential Problem with RFC 7130

RFC 7130 provides a mechanism to run BFD on LAG interfaces in order to verify member link continuity. As illustrated by the dashed line arrow in FIG. 2, a single microBFD session for every enabled address family runs on each member link of the LAG. When using IP/UDP encapsulation for microBFD sessions, member links can use Internet Protocol Version 4 ("IPv4") or Internet Protocol Version 6 ("IPv6") addresses. (Note that in the following, as will be understood by those having ordinary skill in the art in the context of this description, a source and destination IPv6 address pair may be referred to simply as "an IPv6 address.") The use of IPv6 for IP/UDP encapsulation in microBFD sessions (See, e.g., the dashed line arrow over the L2 LAG interfaces 242,244 in FIG. 2.) can cause problems because, unlike IPv4, an IPv6 address has states and therefore cannot be used in communication while it is in TENTATIVE state (i.e., before DAD completes for that address) due to the way it performs duplicate address detection ("DAD"). To ensure that all configured addresses are likely to be unique on a particular link, nodes may run a DAD algorithm on addresses. Generally, the nodes run the DAD algorithm before assigning the addresses to an interface. For example, DAD is typically used to verify that an IPv6 home address is unique on the local area network ("LAN") before the address is assigned to a physical interface. Unless DAD is disabled, the address is not considered assigned to an interface until DAD is successfully completed for the local address. Packets can be received for the all-nodes or solicited-node multicast groups, but there is no response because the address is not yet assigned to the interface.

More specifically, a "member link" (i.e., a link belonging to the LAG) is added to the LAG's load balancer and is available for forwarding traffic on the LAG interface only after the microBFD session for the link is in the UP state. The LAG interface itself is brought UP only after a (e.g., predetermined) minimum number of links of the LAG are in UP state. Unfortunately, however, this is complicated if IPv6 is used for IP/UDP encapsulation for bringing microBFD sessions UP due to the way IPv6 uses DAD. This is because an IPv6 address configured on a link is considered to be TENTATIVE until (1) DAD is run on that IPv6 address, (2) a duplicate address is not found, and (3) the IPv6 address becomes READY. A TENTATIVE IPv6 address cannot be used as the source or destination address in an IP payload and RFC mandates that such packets to be dropped. Unfortunately, however, the DAD protocol does not have any insight into the LAG member links and treats the LAG as a single interface (as illustrated in FIG. 2). DAD runs on a configured address at the time of configuration on an UP interface or later when the interface comes UP. This poses an issue because DAD is run on an IPv6 address when the aggregated interface comes UP, but in order for the aggregated interface to come UP, microBFD sessions need to be UP for each of the member links, and these microBFD sessions may need to use IPv6 address(es) in their control packets. Therefore, there is a "Catch-22" dilemma with using IPv6 addresses in BFD control packets for bringing the microBFD session UP.

If the microBFD sessions are on a layer 3 LAG interface, this doesn't pose an issue since DAD can safely be disabled as the links are point to point. However where the microBFD sessions are on a layer 2 LAG interface using an IPv6 address (such as illustrated in FIG. 2), DAD cannot be disabled. For example, a layer 2 LAG interface 242 or 244 borrowed from an Integrated Routing & Bridging/Routed VLAN Interface ("IRB/RVI") interface or the peer side layer 2 LAG interface 244 or 242 borrows similarly, disabling DAD is not an option since the address forms part of a broadcast domain and DAD needs to be run on such addresses. (IRB/RVI interfaces are described, e.g., in the article, Understanding Integrated Routing and Bridging ("IRB") Interfaces and Routed VLAN Interfaces ("RVI") on EX Series Switches, available online at http://www.juniper-.net/techpubs/en_US/junos13.3/topics/concept/bridging-routed-vlan-interface.html, incorporated herein by reference.)

The RFC 7130 (in its current form) doesn't address the foregoing issue. Indeed, currently, microBFD cannot be run over any member links of a layer 2 LAG any time the LAG is DOWN (and its IPv6 address becomes TENTATIVE). Therefore, it would be useful to modify triggering of DAD so that microBFD can be efficiently run over member links of a layer 2 LAG, using an IPv6 address.

§2. SUMMARY OF THE INVENTION

The problem of being unable to run microBFD using IPv6 address over any member links of a layer 2 LAG when the LAG is DOWN (and its IPv6 address becomes or is TENTATIVE), is solved by running DAD for the address configured for the microBFD once the individual link is in DISTRIBUTING or STANDBY state and triggering (or starting) microBFD once the DAD for that address completes successfully. Further, member links of the LAG may be permitted to continue running microBFD even if the LAG interface is DOWN and even if some other member links (but not all member links) of the LAG are DOWN.

§3. BRIEF DESCRIPTION OF THE DRAWINGS

Figure 3:
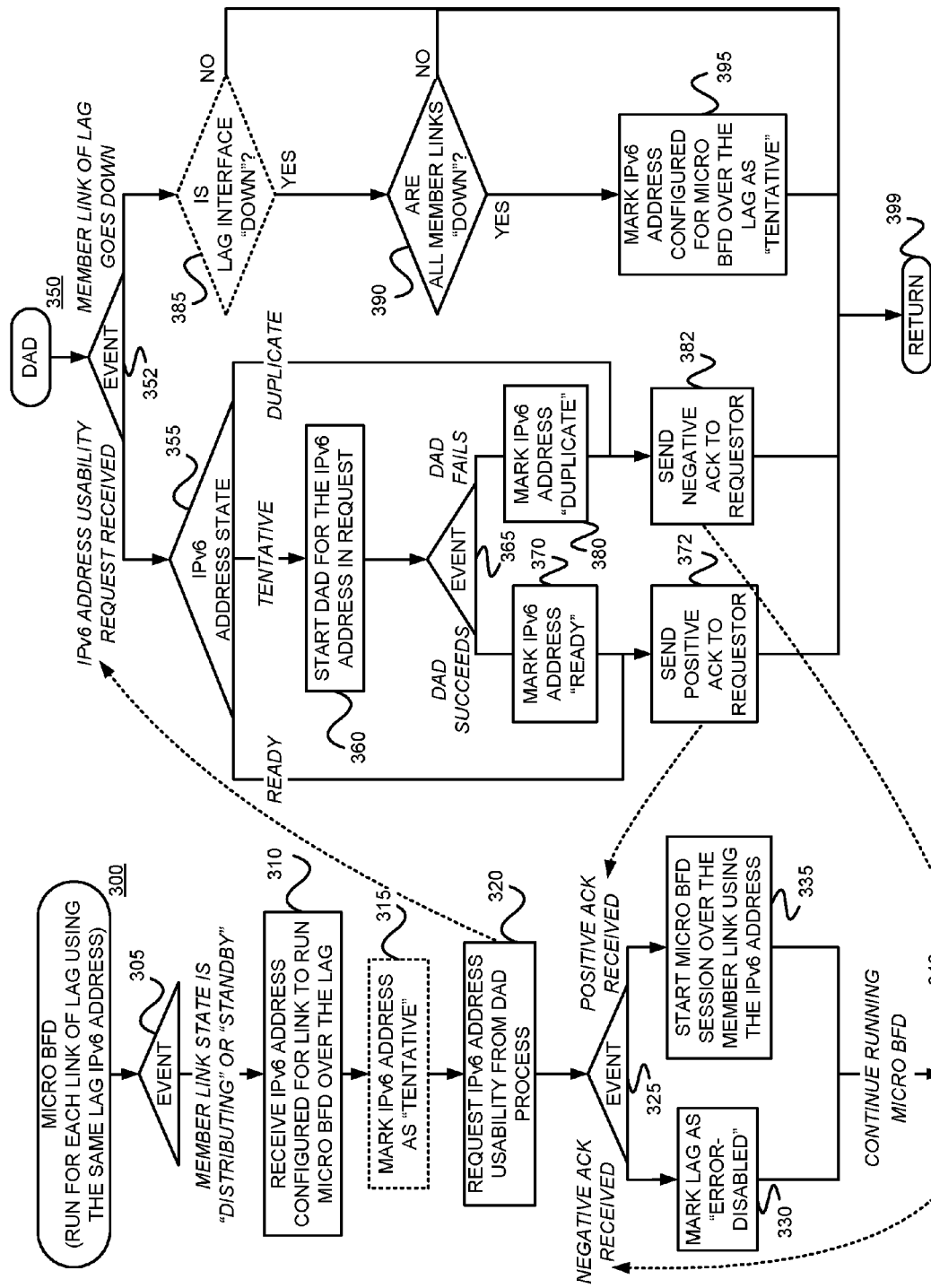

FIG. 3 includes flow diagrams of example methods for implementing microBFD (or some other protocol, such as some other protocol for forwarding detection over member links of a grouping) and duplicate address detection (DAD, or some other address verification protocol) in a manner consistent with the present invention.

Figure 4:
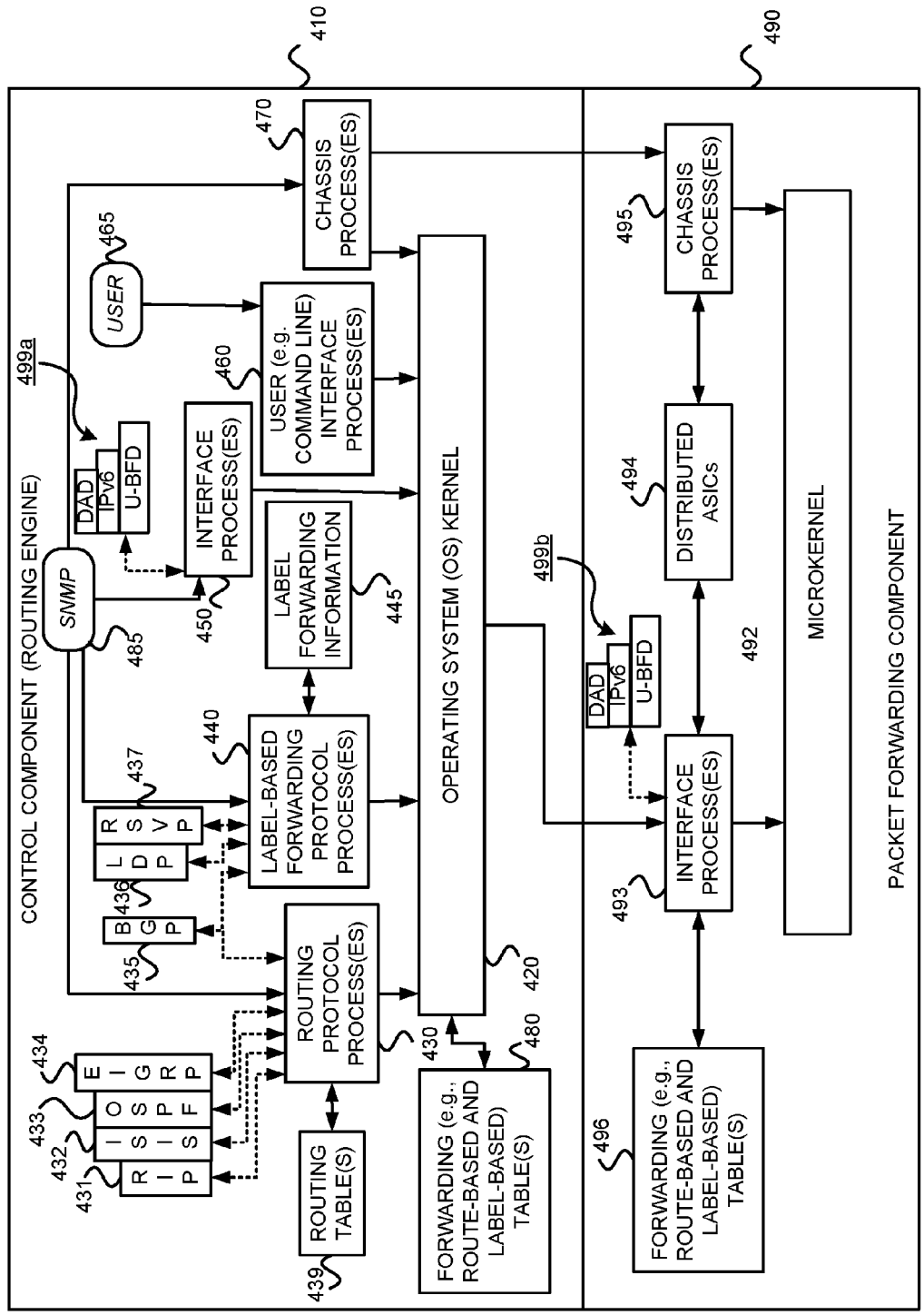

FIG. 4 is a block diagram of an example router on which the present invention may be implemented.

Figure 5:
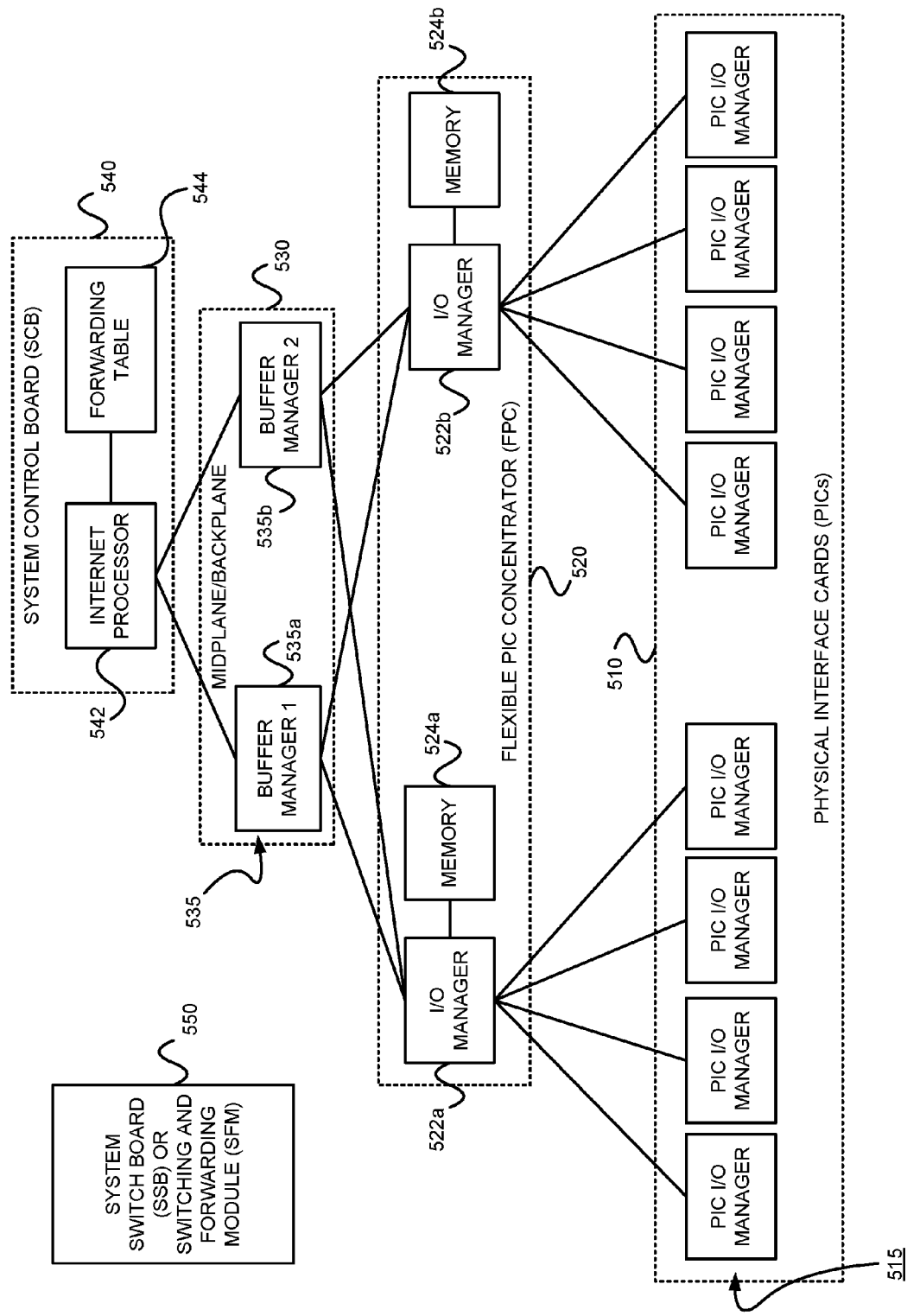

FIG. 5 is a block diagram of example distributed application specific integrated circuits ("ASICs") that may be provided in the example router of FIG. 4.

FIGS. 6A and 6B illustrate example packet forwarding operations of the example distributed ASICs of FIG. 5.

Figure 7:
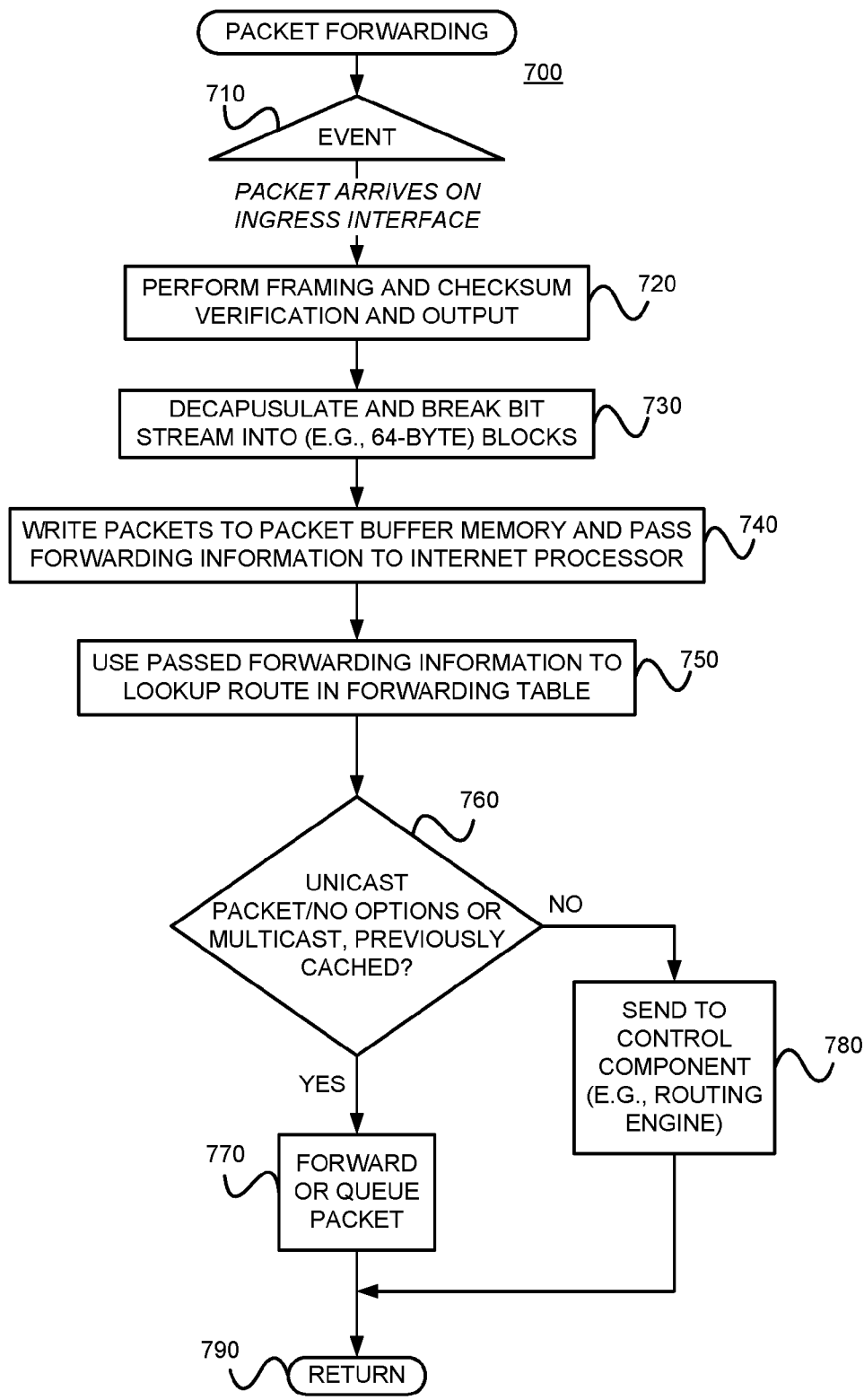

FIG. 7 is a flow diagram of an example packet forwarding method that may be implemented on any of the example routers of FIGS. 4 and 5.

Figure 8:
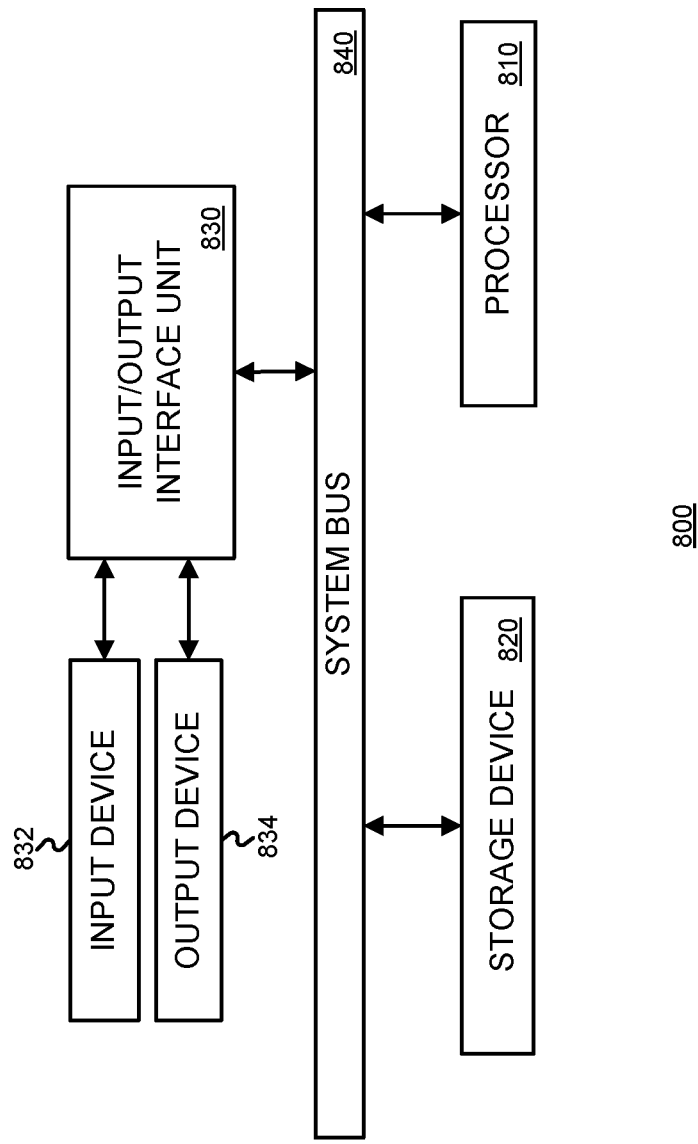

FIG. 8 is a block diagram of an example processor-based system which may be use to execute the example methods consistent with the present invention.

§4. DETAILED DESCRIPTION

The present invention may involve novel methods, apparatus, message formats, and/or data structures for allowing microBFD sessions to continue to run over member links of a LAG (using an IPv6 address that previously was checked by DAD) even when the LAG interface is DOWN (but not all member links of the LAG are DOWN and the LAG's IPv6 address becomes TENTATIVE). DAD may be run for the address configured for the microBFD once the individual link is in DISTRIBUTING or STANDBY state, and microBFD may be triggered (or started) once the DAD for that address completes successfully. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§4.1 Example Methods

FIG. 3 includes flow diagrams of example methods 300 and 350 for implementing microBFD (or some other protocol for forwarding detection over member links of a grouping) and duplicate address detection (DAD, or some other verification protocol), respectively, in a manner consistent with the present invention.

In the example method 300, when a member link state is either DISTRIBUTING or STANDBY (Event 305), an IPv6 address configured for the link to run microBFD over the LAG is received (Block 310) and usability of the IPv6 address (which may have been marked as "TENTATIVE" as indicated by block 315) for the microBFD session is requested from the example DAD method 350. (Block 320)

Referring to the example DAD method 350, responsive to receipt of the IPv6 address usability request, the example DAD method 350 performs different acts depending on the state of the IPv6 address. (Event 352 and State 355) If the IPv6 address is "READY" (left branch of State 355), a positive acknowledgement is sent back to the requestor (Block 372) and the method 350 is left (RETURN node 399). If the IPv6 address is "DUPLICATE", a negative acknowledgement is sent back to the requestor (Block 382) and the method 350 is left (RETURN node 399). Finally, if the IPv6 address is "TENTATIVE", the request is processed to determine whether or not the IPv6 address is useable. That is, if the IPv6 address is in "TENTATIVE" state, the method 350 will start a duplicate address detection process for the IPv6 address of the LAG. (Block 360) Once the DAD is complete and succeeds (left branch of Event 365), then the IPv6 address is marked as "READY" (Block 370), a positive acknowledgement is sent back to the requestor (Block 372) and the method 350 is left (RETURN node 399). If, on the other hand, the DAD is complete and fails (right branch of Event 365), the address is marked "DUPLICATE" (Block 380), a negative acknowledgement is sent back to the requestor (Block 382) and the method 350 is left (RETURN node 399).

Referring back to the example microBFD method 300, if a positive acknowledgement is received from the DAD method 350 (right branch of Event 325), the microBFD session is started over that member link using the "READY" IPv6 address (Block 335) before the method 300 is left (Return node 340). Otherwise, if a negative acknowledgement is received from the DAD method 350 (left branch of Event 325), the LAG is marked as "ERROR-Disabled" (Block 33) before the method 300 is left (Return node 340).

Finally, in some implementations of link aggregation groups, the LAG interface is brought DOWN when a predetermined (e.g., configurable) minimum number of member links of the LAG are not available. However, even though the LAG interface is down, example embodiments consistent with the present invention permit microBFD sessions to be run (or to continue to run) over those member links that are UP, using the IPv6 address. More specifically, referring to example method 350, if a member link of the LAG goes DOWN (right branch of Event 352), it is determined whether or not the LAG interface is to be brought DOWN. To reiterate, in some implementations, the LAG interface is brought DOWN when the minimum number of member links of the LAG are not available. If the LAG interface is not DOWN (No branch of Decision 385), the method 350 is left (Return Node 399), in which case, any UP member links of the LAG are able to continue running microBFD. If, on the other hand, the LAG interface is DOWN (Yes branch of Decision 385), then it is determined whether or not all member links of the LAG are DOWN. If, it is determined that not all of the member links of the LAG are DOWN (No branch of Decision 390), the method 350 is left (Return Node 399), in which case, any UP member links of the LAG are permitted to continue running microBFD. If, on the other hand, it is determined that all of the member links of the LAG are DOWN (Yes branch of Decision 390), then the IPv6 address configured for the microBFD over the LAG is marked as TENTATIVE (Block 395), in which case none of the member links of the LAG will run microBFD, and the method 350 is left (Return Node 399).

Consistent with the foregoing example method 350, the IPv6 address which is marked for microBFD sessions would be marked as to "TENTATIVE" only when all of the member links of the LAG are DOWN; not necessarily when the LAG interface goes DOWN. When a member link comes UP, the example methods described above may be used to run DAD on the IPv6 address.

§4.2 Example Apparatus, Such as Example Nodes and Routers, on which the Example Methods May be Performed As just discussed above, and referring to FIG. 4, some example routers 400 include a control component (e.g., routing engine) 410 and a packet forwarding component (e.g., a packet forwarding engine) 490.

The control component 410 may include an operating system (OS) kernel 420, routing protocol process(es) 430, label-based forwarding protocol process(es) 440, interface process(es) 450, user interface (e.g., command line interface) process(es) 460, and chassis process(es) 470, and may store routing table(s) 439, label forwarding information 445, and forwarding (e.g., route-based and/or label-based) table(s) 480. As shown, the routing protocol process(es) 430 may support routing protocols such as the routing information protocol ("RIP") 431, the intermediate system-to-intermediate system protocol ("IS-IS") 432, the open shortest path first protocol ("OSPF") 433, the enhanced interior gateway routing protocol ("EIGRP") 434 and the boarder gateway protocol ("BGP") 435, and the label-based forwarding protocol process(es) 440 may support protocols such as BGP 435, the label distribution protocol ("LDP") 436 and the resource reservation protocol ("RSVP") 437. One or more components (not shown) may permit a user 465 to interact with the user interface process(es) 460. Similarly, one or more components (not shown) may permit an external device to interact with one or more of the router protocol process(es) 430, the label-based forwarding protocol process(es) 440, the interface process(es) 450, and the chassis process(es) 470, via SNMP 485, and such processes may send information to an external device via SNMP 485.

The packet forwarding component 490 may include a microkernel 492, interface process(es) 493, distributed application specific integrated circuits ("ASICs") 494, chassis process(es) 495 and forwarding (e.g., route-based and/or label-based) table(s) 496.

In the example router 400 of FIG. 4, the control component 410 handles tasks such as performing routing protocols, performing label-based forwarding protocols, control packet processing, etc., which frees the packet forwarding component 490 to forward received packets quickly. That is, received control packets (e.g., routing protocol packets and/or label-based forwarding protocol packets) are not fully processed on the packet forwarding component 490 itself, but are passed to the control component 410, thereby reducing the amount of work that the packet forwarding component 490 has to do and freeing it to process packets to be forwarded efficiently. Thus, the control component 410 is primarily responsible for running routing protocols and/or label-based forwarding protocols, maintaining the routing tables and/or label forwarding information, sending forwarding table updates to the packet forwarding component 490, and performing system management. The example control component 410 may handle routing protocol packets, provide a management interface, provide configuration management, perform accounting, and provide alarms. The processes 430, 440, 450, 460 and 470 may be modular, and may interact with the OS kernel 420. That is, nearly all of the processes communicate directly with the OS kernel 420. Using modular software that cleanly separates processes from each other isolates problems of a given process so that such problems do not impact other processes that may be running. Additionally, using modular software facilitates easier scaling.

Still referring to FIG. 4, the example OS kernel 420 may incorporate an application programming interface ("API") system for external program calls and scripting capabilities. The control component 410 may be based on an Intel PCI platform running the OS from flash memory, with an alternate copy stored on the router's hard disk. The OS kernel 420 is layered on the Intel PCI platform and establishes communication between the Intel PCI platform and processes of the control component 410. The OS kernel 420 also ensures that the forwarding tables 496 in use by the packet forwarding component 490 are in sync with those 480 in the control component 410. Thus, in addition to providing the underlying infrastructure to control component 410 software processes, the OS kernel 420 also provides a link between the control component 410 and the packet forwarding component 490.

Referring to the routing protocol process(es) 430 of FIG. 4, this process(es) 430 provides routing and routing control functions within the platform. In this example, the RIP 431, ISIS 432, OSPF 433 and EIGRP 434 (and BGP 435) protocols are provided. Naturally, other routing protocols may be provided in addition, or alternatively. Similarly, the label-based forwarding protocol process(es) 440 provides label forwarding and label control functions. In this example, the LDP 436 and RSVP 437 (and BGP 435) protocols are provided. Naturally, other label-based forwarding protocols (e.g., MPLS) may be provided in addition, or alternatively. In the example router 400, the routing table(s) 439 is produced by the routing protocol process(es) 430, while the label forwarding information 445 is produced by the label-based forwarding protocol process(es) 440.

Still referring to FIG. 4, the interface process(es) 450 performs configuration of the physical interfaces (Recall, e.g., 416 and 426 of FIG. 4.) and encapsulation.

The example control component 410 may provide several ways to manage the router. For example, it 410 may provide a user interface process(es) 460 which allows a system operator 465 to interact with the system through configuration, modifications, and monitoring. The SNMP 485 allows SNMP-capable systems to communicate with the router platform. This also allows the platform to provide necessary SNMP information to external agents. For example, the SNMP 485 may permit management of the system from a network management station running software, such as Hewlett-Packard's Network Node Manager (HP-NNM), through a framework, such as Hewlett-Packard's OpenView. Accounting of packets (generally referred to as traffic statistics) may be performed by the control component 410, thereby avoiding slowing traffic forwarding by the packet forwarding component 490.

Although not shown, the example router 400 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provides interaction with a command line interface (CLI) 460 via a console port, an auxiliary port, and/or a management Ethernet port The packet forwarding component 490 is responsible for properly outputting received packets as quickly as possible. If there is no entry in the forwarding table for a given destination or a given label and the packet forwarding component 490 cannot perform forwarding by itself, it 490 may send the packets bound for that unknown destination off to the control component 410 for processing. The example packet forwarding component 490 is designed to perform Layer 2 and Layer 3 switching, route lookups, and rapid packet forwarding.

As shown in FIG. 4, the example packet forwarding component 490 has an embedded microkernel 492, interface process(es) 493, distributed ASICs 494, and chassis process(es) 495, and stores a forwarding (e.g., route-based and/or label-based) table(s) 496. The microkernel 492 interacts with the interface process(es) 493 and the chassis process(es) 495 to monitor and control these functions. The interface process(es) 492 has direct communication with the OS kernel 420 of the control component 410. This communication includes forwarding exception packets and control packets to the control component 410, receiving packets to be forwarded, receiving forwarding table updates, providing information about the health of the packet forwarding component 490 to the control component 410, and permitting configuration of the interfaces from the user interface (e.g., CLI) process(es) 460 of the control component 410. The stored forwarding table(s) 496 is static until a new one is received from the control component 410. The interface process(es) 493 uses the forwarding table(s) 496 to look up next-hop information. The interface process(es) 493 also has direct communication with the distributed ASICs 494. Finally, the chassis process(es) 495 may communicate directly with the microkernel 492 and with the distributed ASICs 494.

Referring back to distributed ASICs 494 of FIG. 4, FIG. 5 is an example of how the ASICS may be distributed in the packet forwarding component 490 to divide the responsibility of packet forwarding. As shown in FIG. 5, the ASICs of the packet forwarding component 490 may be distributed on physical interface cards ("PICs") 510, flexible PIC concentrators ("FPCs") 520, a midplane or backplane 530, and a system control board(s) 540 (for switching and/or forwarding). Switching fabric is also shown as a system switch board ("SSB"), or a switching and forwarding module ("SFM") 550. Each of the PICs 510 includes one or more PIC I/O managers 515. Each of the FPCs 520 includes one or more I/O managers 522, each with an associated memory 524. The midplane/backplane 530 includes buffer managers 535*a*, 535*b*. Finally, the system control board 540 includes an internet processor 542 and an instance of the forwarding table 544 (Recall, e.g., 496 of FIG. 4).

Still referring to FIG. 5, the PICs 510 contain the interface ports. Each PIC 510 may be plugged into an FPC 520. Each individual PIC 510 may contain an ASIC that handles media-specific functions, such as framing or encapsulation. Some example PICs 510 provide SDH/SONET, ATM, Gigabit Ethernet, Fast Ethernet, and/or DS3/E3 interface ports.

An FPC 520 can contain from one or more PICs 510, and may carry the signals from the PICs 510 to the midplane/backplane 530 as shown in FIG. 5.

The midplane/backplane 530 holds the line cards. The line cards may connect into the midplane/backplane 530 when inserted into the example router's chassis from the front. The control component (e.g., routing engine) 410 may plug into the rear of the midplane/backplane 530 from the rear of the chassis. The midplane/backplane 530 may carry electrical (or optical) signals and power to each line card and to the control component 410.

The system control board 540 may perform forwarding lookup. It 540 may also communicate errors to the routing engine. Further, it 540 may also monitor the condition of the router based on information it receives from sensors. If an abnormal condition is detected, the system control board 540 may immediately notify the control component 410.

Referring to FIGS. 5, 6A and 6B, in some exemplary routers, each of the PICs 510,510' contains at least one I/O manager ASIC 515 responsible for media-specific tasks, such as encapsulation. The packets pass through these I/O ASICs on their way into and out of the router. The I/O manager ASIC 515 on the PIC 510,510' is responsible for managing the connection to the I/O manager ASIC 522 on the FPC 520,520', managing link-layer framing and creating the bit stream, performing cyclical redundancy checks (CRCs), and detecting link-layer errors and generating alarms, when appropriate. The FPC 520 includes another I/O manager ASIC 522. This ASIC 522 takes the packets from the PICs 510 and breaks them into (e.g., 64-byte) memory blocks. This FPC I/O manager ASIC 522 sends the blocks to a first distributed buffer manager (DBM) 535*a'*, decoding encapsulation and protocol-specific information, counting packets and bytes for each logical circuit, verifying packet integrity, and applying class of service (CoS) rules to packets. At this point, the packet is first written to memory. More specifically, the example DBM ASIC 535*a'* manages and writes packets to the shared memory 524 across all FPCs 520. In parallel, the first DBM ASIC 535*a'* also extracts information on the destination of the packet and passes this forwarding-related information to the Internet processor 542/542'. The Internet processor 542/542' performs the route lookup using the forwarding table 544 and sends the information over to a second DBM ASIC 535*b'*. The Internet processor ASIC 542/542' also collects exception packets (i.e., those without a forwarding table entry) and sends them to the control component 410. The second DBM ASIC 535*b'* then takes this information and the 64-byte blocks and forwards them to the I/O manager ASIC 522 of the egress FPC 520/520' (or multiple egress FPCs, in the case of multicast) for reassembly. (Thus, the DBM ASICs 535*a'* and 535*b'* are responsible for managing the packet memory 524 distributed across all FPCs 520/520', extracting forwarding-related information from packets, and instructing the FPC where to forward packets.)

The I/O manager ASIC 522 on the egress FPC 520/520' may perform some value-added services. In addition to incrementing time to live (TTL) values and re-encapsulating the packet for handling by the PIC 510, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 522 on the egress FPC 520/520' may be responsible for receiving the blocks from the second DBM ASIC 535*b'*, incrementing TTL values, queuing a pointer to the packet, if necessary, before applying CoS rules, re-encapsulating the blocks, and sending the encapsulated packets to the PIC I/O manager ASIC 515.

FIG. 7 is a flow diagram of an example method 700 for providing packet forwarding in the example router. The main acts of the method 700 are triggered when a packet is received on an ingress (incoming) port or interface. (Event 710) The types of checksum and frame checks that are required by the type of medium it serves are performed and the packet is output, as a serial bit stream. (Block 720) The packet is then decapsulated and parsed into (e.g., 64-byte) blocks. (Block 730) The packets are written to buffer memory and the forwarding information is passed on the Internet processor. (Block 740) The passed forwarding information is then used to lookup a route in the forwarding table. (Block 750) Note that the forwarding table can typically handle unicast packets that do not have options (e.g., accounting) set, and multicast packets for which it already has a cached entry. Thus, if it is determined that these conditions are met (YES branch of Decision 760), the packet forwarding component finds the next hop and egress interface, and the packet is forwarded (or queued for forwarding) to the next hop via the egress interface (Block 770) before the method 700 is left (Node 790) Otherwise, if these conditions are not met (NO branch of Decision 760), the forwarding information is sent to the control component 410 for advanced forwarding resolution (Block 780) before the method 700 is left (Node 790).

Referring back to block 770, the packet may be queued. Actually, as stated earlier with reference to FIG. 5, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 522 may send a request for the packet to the second DBM ASIC 535*b*. The DBM ASIC 535 reads the blocks from shared memory and sends them to the I/O manager ASIC 522 on the FPC 520, which then serializes the bits and sends them to the media-specific ASIC of the egress interface. The I/O manager ASIC 515 on the egress PIC 510 may apply the physical-layer framing, perform the CRC, and send the bit stream out over the link.

Referring back to block 780 of FIG. 7, as well as FIG. 5, regarding the transfer of control and exception packets, the system control board 540 handles nearly all exception packets. For example, the system control board 540 may pass exception packets to the control component 410.

Figure 1:
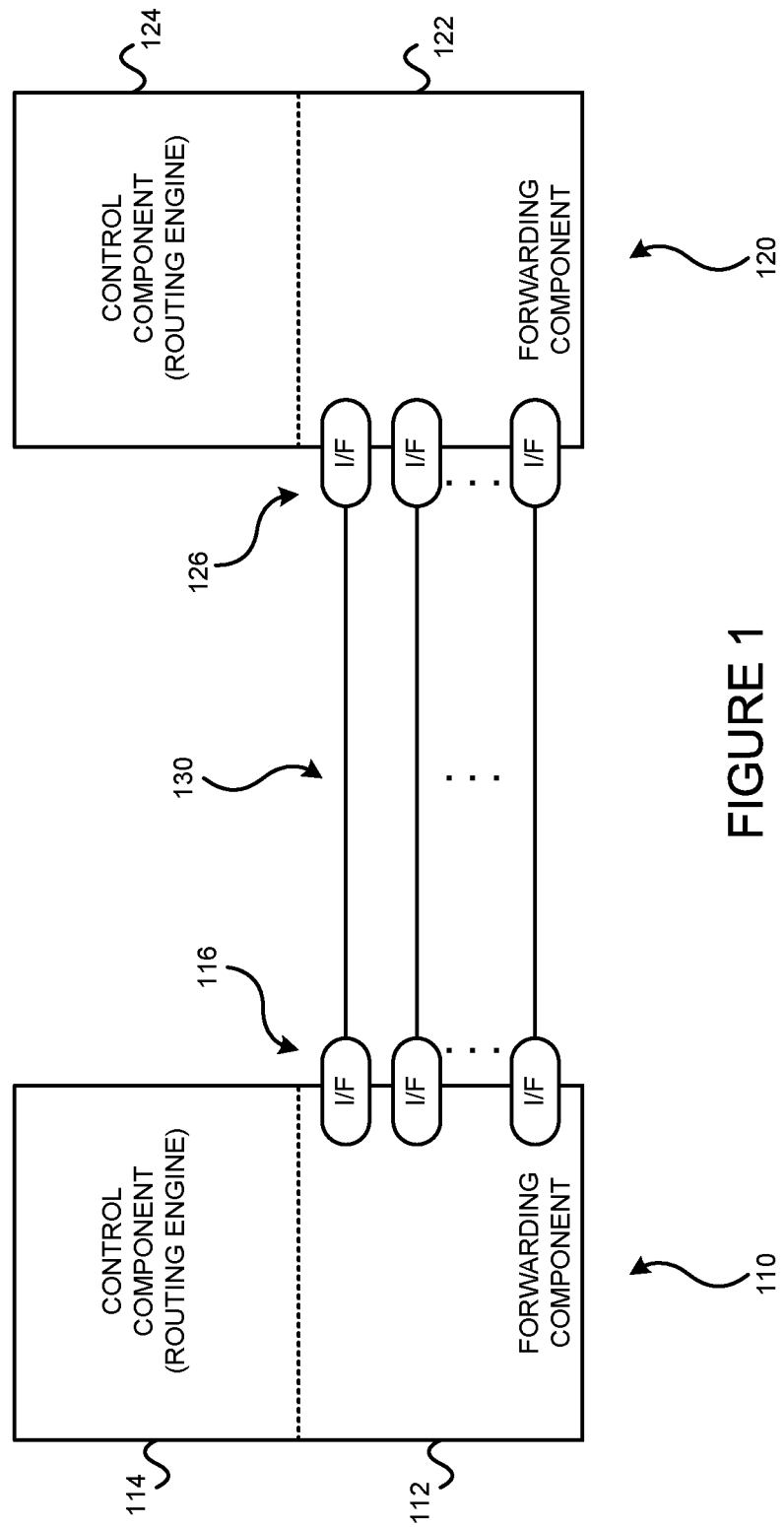
FIG. 1 illustrates an example environment, including two data forwarding systems coupled via communications links, in which example embodiments consistent with the present invention may be used.
Figure 2:
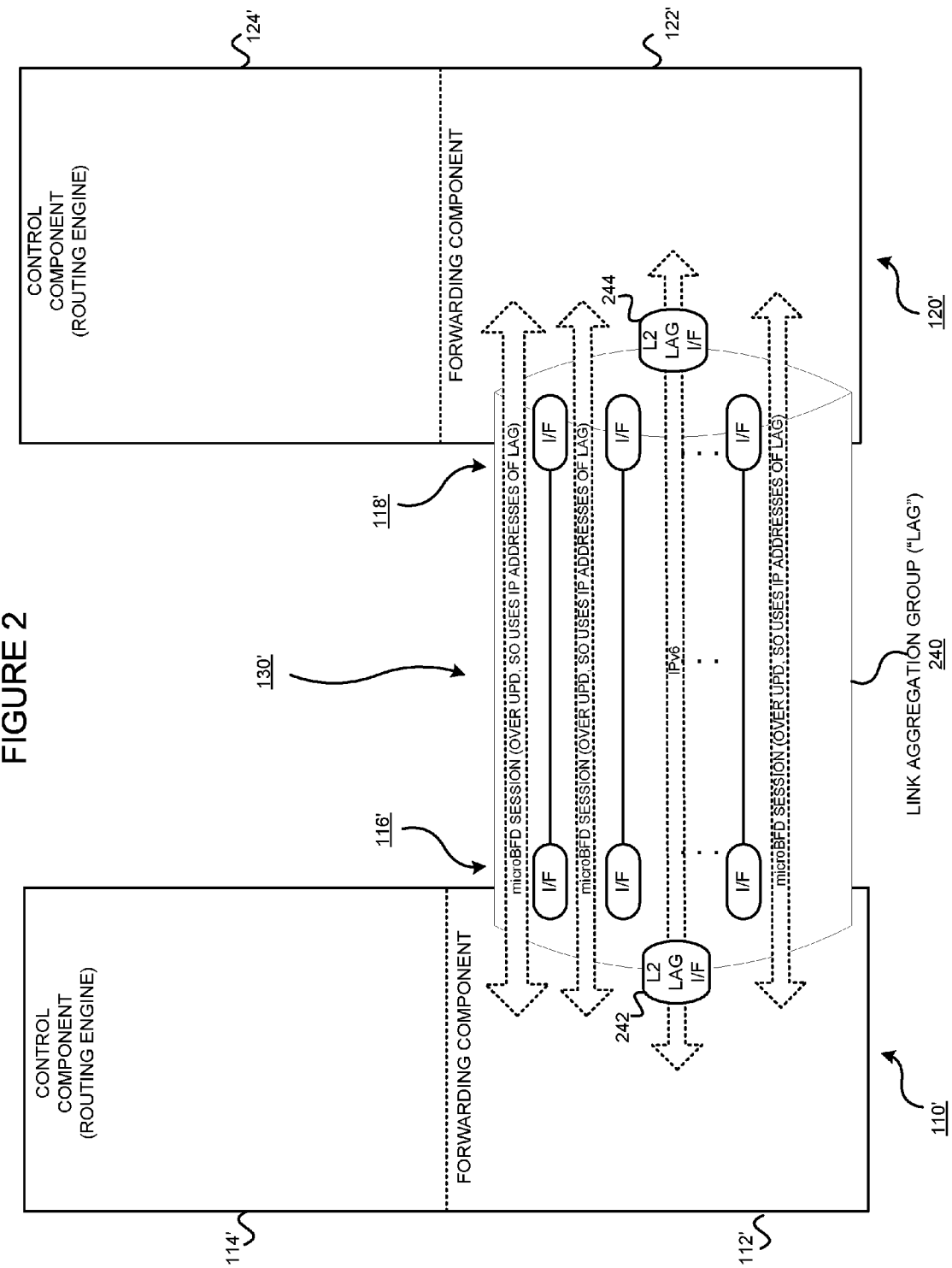
FIG. 2 illustrates an example environment, including two data forwarding systems coupled via a layer 2 link aggregation group (LAG), in which example embodiments consistent with the present invention may be used.

Although example embodiments consistent with the present invention may be implemented on the example routers of FIG. 2 or 4 (See especially the microBFD, IPv6 and DAD processes 499*a* and/or 499*b* of FIG. 4.), embodiments consistent with the present invention may be implemented on communications network nodes (e.g., routers, switches, etc.) having different architectures. More generally, embodiments consistent with the present invention may be implemented on an example system 900 as illustrated on FIG. 8.

FIG. 8 is a block diagram of an exemplary machine 800 that may perform one or more of the processes described, and/or store information used and/or generated by such processes. The exemplary machine 800 includes one or more processors 810, one or more input/output interface units 830, one or more storage devices 820, and one or more system buses and/or networks 840 for facilitating the communication of information among the coupled elements. One or more input devices 832 and one or more output devices 834 may be coupled with the one or more input/output interfaces 830. The one or more processors 810 may execute machine-executable instructions (e.g., C or C++ running on is a Unix operating system, such as one of the Berkeley Software Distribution ("BSD") derivatives developed and distributed by the Computer Systems Research Group ("CSRG") of the University of California, Berkeley, the Linux operating system widely available from a number of vendors such as Red Hat, Inc. of Durham, N.C., etc.) to effect one or more aspects of the present invention. At least a portion of the machine executable instructions may be stored (temporarily or more permanently) on the one or more storage devices 820 and/or may be received from an external source via one or more input interface units 830. The machine executable instructions may be stored as various software modules, each module performing one or more operations. Functional software modules are examples of components of the invention.

In some embodiments consistent with the present invention, the processors 810 may be one or more microprocessors and/or ASICs. The bus 840 may include a system bus. The storage devices 820 may include system memory, such as read only memory (ROM) and/or random access memory (RAM). The storage devices 820 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, solid-state non-volatile storage, or some other non-transitory computer readable medium.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention might be implemented in hardware, such as one or more field programmable gate arrays ("FPGAs"), one or more integrated circuits such as ASICs, one or more network processors, etc. Alternatively, or in addition, embodiments consistent with the present invention might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

As understood by those having ordinary skill in the art, as used in this application, a "unit," "component," "element," "module," "device," "mechanism," "member," or "process" may be implemented as circuitry, such as integrated circuits, ASICs, field programmable logic (or gate) arrays ("FPLAs"), etc., and/or software implemented on a processor, such as a microprocessor.

§4.4 Alternatives, Refinements and Extensions

Although some example embodiments consistent with the present invention were described as being used in the context of microBFD, other example embodiments consistent with the present invention can be used in the context of other processes or protocols that need to check the usability of an address, such as an IPv6 address.

Although some example embodiments consistent with the present invention were described as being used with a duplicate address detection ("DAD") process, other example embodiments consistent with the present invention can be used in the context of other address checking processes.

Although some example embodiments consistent with the present invention discussed link states such as DISTRIBUTING, STANDBY, UP and DOWN, and address states as READY, TENTATIVE or DUPLICATE, these are to broadly interpreted to include states that are functionally equivalent.

§4.4 Conclusions

In platforms that support running duplicate address detection on link flaps, in a regular case the address would be marked TENTATIVE when a layer 3 link goes down, thereby forcing DAD to be run on that address when the link comes up. However in the case of microBFD this also poses conformance issues. The LAG interface may be brought DOWN when a predetermined (e.g., configurable) minimum number of LAG member links are not available. However, even though the LAG interface is down, example embodiments consistent with the present invention permit microBFD sessions to be run (or to continue to run) over those member links that are UP using the IPv6 address of the LAG. Example embodiments consistent with the present invention may do so as follows. The address which is marked for microBFD sessions would be marked as to TENTATIVE only when the last member link of the LAG goes DOWN (i.e., when all member links are DOWN); not necessarily when the LAG interface goes DOWN. When a member link comes UP, the example methods described above may be used to run DAD on the IPv6 address. Example embodiments consistent with the present invention provide or facilitate a method to run DAD on addresses (e.g., source and/or destination IPv6 addresses) used for microBFD sessions and ensure that the same is in conformance with the RFC (2462).

What is claimed is:

1. In a data forwarding device supporting an aggregated link including a plurality of member links, a method for performing a protocol on the member links of the aggregated link that uses an address of the aggregated link, the method comprising:
   a) checking a usability of the address;
   b) responsive to a determination that the address is usable, running the protocol on the member links;
   c) responsive to a determination that the aggregated link is DOWN, permitting the protocol to continue running on any of the member links that are UP; and
   d) responsive to a determination that all of the member links of the aggregated link are DOWN,
      1) marking the address so that its usability needs to be rechecked, and
      2) discontinuing the protocol on the member links,
   and otherwise, responsive to a determination that not all of the member links of the aggregated link are DOWN, permitting the protocol to continue running on any member links that are UP.

2. The method of claim 1 wherein the protocol is a micro Bidirectional Forwarding Detection ("microBFD") protocol.

3. The method of claim 2 wherein the address is an Internet Protocol version 6 ("IPv6") address.

4. The method of claim 3 wherein the usability of the address is checked using a duplicate address detection ("DAD") protocol.

5. The method of claim 1 wherein the aggregated link is managed using a Link Aggregation Control Protocol" ("LACP").

6. The method of claim 5 wherein the address is an Internet Protocol version 6 ("IPv6") address.

7. The method of claim 6 wherein the usability of the address is checked using a duplicate address detection ("DAD") protocol.

8. The method of claim 1 wherein the address is an Internet Protocol version 6 ("IPv6") address.

9. The method of claim 8 wherein the usability of the address is checked using a duplicate address detection ("DAD") protocol.

10. The method of claim 1 wherein each of the member links include (1) a first interface, (2) a second interface, and (3) a physical link coupling the first and second interfaces.

11. The method of claim 1 wherein each of the member links include (1) a first interface, (2) a second interface, and (3) a wireless link coupling the first and second interfaces.

12. A data forwarding device comprising:
   a) a plurality of interfaces of a plurality of member links defining an aggregated link;
   b) at least one processor; and
   c) a non-transitory storage device storing processor-executable instructions which, when executed by the at least one processor, cause the at least one processor to perform a method for performing a protocol on the member links of the aggregated link that uses an address of the aggregated link, the method including
      1) checking a usability of the address;
      2) responsive to a determination that the address is usable, running the protocol on the member links;
      3) responsive to a determination that the aggregated link is DOWN, permitting the protocol to continue running on any of the member links that are UP; and
      4) responsive to a determination that all of the member links of the aggregated link are DOWN,
         A) marking the address so that its usability needs to be rechecked, and
         B) discontinuing the protocol on the member links,
      and otherwise, responsive to a determination that not all of the member links of the aggregated link are DOWN, permitting the protocol to continue running on any member links that are UP.

13. The data forwarding device of claim 12 wherein the protocol is a micro Bidirectional Forwarding Detection ("microBFD") protocol.

14. The data forwarding device of claim 13 wherein the address is an Internet Protocol version 6 ("IPv6") address.

15. The data forwarding device of claim 14 wherein the usability of the address is checked using a duplicate address detection ("DAD") protocol.

16. The data forwarding device of claim 12 wherein the aggregated link is managed using a Link Aggregation Control Protocol" ("LACP").

17. The data forwarding device of claim 16 wherein the address is an Internet Protocol version 6 ("IPv6") address.

18. The data forwarding device of claim 17 wherein the usability of the address is checked using a duplicate address detection ("DAD") protocol.

19. The data forwarding device of claim 12 wherein the address is an Internet Protocol version 6 ("IPv6") address.

20. The data forwarding device of claim 19 wherein the usability of the address is checked using a duplicate address detection ("DAD") protocol.

21. A non-transitory storage device storing processor-executable instructions which, when executed by the at least one processor of a data forwarding device supporting an aggregated link including a plurality of member links, cause the at least one processor to perform a method for performing a protocol on the member links of the aggregated link that uses an address of the aggregated link, the method including
   a) checking a usability of the address;
   b) responsive to a determination that the address is usable, running the protocol on the member links;
   c) responsive to a determination that the aggregated link is DOWN, permitting the protocol to continue running on any of the member links that are UP; and
   d) responsive to a determination that all of the member links of the aggregated link are DOWN,
      1) marking the address so that its usability needs to be rechecked, and
      2) discontinuing the protocol on the member links,
   and otherwise, responsive to a determination that not all of the member links of the aggregated link are DOWN, permitting the protocol to continue running on any member links that are UP.

* * * * *